United States Patent
Kellagher et al.

(10) Patent No.: US 8,407,328 B2
(45) Date of Patent: Mar. 26, 2013

(54) A/V EQUIPMENT CONTROL OVER A NETWORK

(75) Inventors: Sandy Kellagher, Chichester (GB); Jonathan Riches, Southsea (GB)

(73) Assignee: Snell & Wilcox Limited, Hampshire (GB)

(*) Notice: Subject to any disclaimer, the term of this patent is extended or adjusted under 35 U.S.C. 154(b) by 1374 days.

(21) Appl. No.: 11/404,507

(22) Filed: Apr. 14, 2006

(65) Prior Publication Data

US 2006/0277297 A1    Dec. 7, 2006

(30) Foreign Application Priority Data

Apr. 15, 2005  (GB) .................................. 0507678.1

(51) Int. Cl.
H06F 15/16  (2006.01)
(52) U.S. Cl. ........ 709/223; 709/224; 709/225; 709/226; 710/5; 710/6; 710/41
(58) Field of Classification Search .................. 709/220, 709/221, 222, 223, 224; 705/2, 30; 711/161, 711/162; 370/252, 256
See application file for complete search history.

(56) References Cited

U.S. PATENT DOCUMENTS

| | | | |
|---|---|---|---|
| 5,452,433 A | 9/1995 | Nihart et al. | |
| 5,812,771 A | 9/1998 | Fee et al. | |
| 6,253,240 B1* | 6/2001 | Axberg et al. | 709/223 |
| 6,430,613 B1* | 8/2002 | Brunet et al. | 709/223 |
| 6,532,491 B1 | 3/2003 | Lakis et al. | |
| 6,539,422 B1* | 3/2003 | Hunt et al. | 709/217 |
| 7,143,155 B1* | 11/2006 | Reed et al. | 709/223 |
| 7,668,953 B1* | 2/2010 | Sinclair et al. | 709/224 |
| 2002/0065905 A1* | 5/2002 | Kliland et al. | 709/220 |
| 2002/0116490 A1* | 8/2002 | Hogg et al. | 709/224 |
| 2002/0120737 A1* | 8/2002 | Martin et al. | 709/224 |
| 2002/0121913 A1* | 9/2002 | Miller et al. | 324/760 |
| 2003/0023611 A1* | 1/2003 | Benjamin et al. | 707/101 |
| 2003/0069955 A1* | 4/2003 | Gieseke et al. | 709/223 |
| 2004/0006619 A1* | 1/2004 | Syed et al. | 709/224 |
| 2004/0006620 A1* | 1/2004 | Howard et al. | 709/224 |
| 2004/0088403 A1* | 5/2004 | Aggarwal | 709/224 |
| 2004/0143428 A1* | 7/2004 | Rappaport et al. | 703/22 |

(Continued)

FOREIGN PATENT DOCUMENTS

| | | |
|---|---|---|
| EP | 1158720 | 11/2001 |
| WO | WO95/20852 | 3/1995 |
| WO | 2005/069544 | 7/2005 |

OTHER PUBLICATIONS

"Introduction to SNMP"—NSRC, May 2004 https://nsrc.org/workshops/2012/apricot-nmm/materials/snmp.pdf.*

(Continued)

*Primary Examiner* — Krista Zele
*Assistant Examiner* — Randy Scott
(74) *Attorney, Agent, or Firm* — Fish & Richarson P.C.

(57) ABSTRACT

Audio visual or other equipment modules in a common enclosure are controlled through an SNMP control agent by interrogating module locations for the presence of an equipment module; determining an equipment type; determining a list of available control objects associated with that equipment type; associating values identified by equipment type and by control parameter with the control objects of equipment modules to be controlled; and communicating said values across a network.

13 Claims, 4 Drawing Sheets

U.S. PATENT DOCUMENTS

2004/0150519 A1* 8/2004 Husain et al. ............... 340/506
2004/0221041 A1* 11/2004 Tabbara ....................... 709/227
2004/0236831 A1* 11/2004 Ohto et al. ................... 709/204
2005/0025071 A1* 2/2005 Miyake et al. ............... 370/254
2005/0220036 A1* 10/2005 Sugitani et al. .............. 370/252
2006/0047800 A1* 3/2006 Caveney et al. ............. 709/223

OTHER PUBLICATIONS

"Snmp"—Jean Parrend, May 2003 www.rzo.free.fr/docs_jean/snmp.pdf.*

* cited by examiner

A/V EQUIPMENT CONTROL OVER A NETWORK

FIELD OF INVENTION

This invention concerns control and monitoring of systems, and in particular systems using data networks.

RELATED APPLICATIONS

This application claims the benefit of the priority date of priority GB Application No. 0507678.1, filed on Apr. 15, 2005, the contents of which are incorporated herein by reference.

BACKGROUND OF THE INVENTION

The control of systems via data networks is well known; the Simple Network Management Protocol (SNMP) is a popular example of a standardized system in which a control software program, a "manager" interacts over a network with one or more other software programs, or "agents", which monitor and/or control apparatus or system elements. Standard software for implementing SNMP agents and managers (or key parts of them) is commercially available so that SNMP-based control systems can be implemented with a minimum of additional programming work.

In SNMP the values of simple data "objects" are reported from an agent to a manager, or values are set by an agent in response to instructions from a manager. Typical data objects may be parameters characterizing a process, warning messages or the states of switches, controls etc. In the protocol for communication between manager and agent, an object is identified by an object identifier "OID" which comprises a string of numbers separated by dots. These numbers can be interpreted as nodes in a tree, and a sub-tree starting at a particular node can be allocated to a particular company or organization which then determines the meaning of those nodes.

Figure 1:
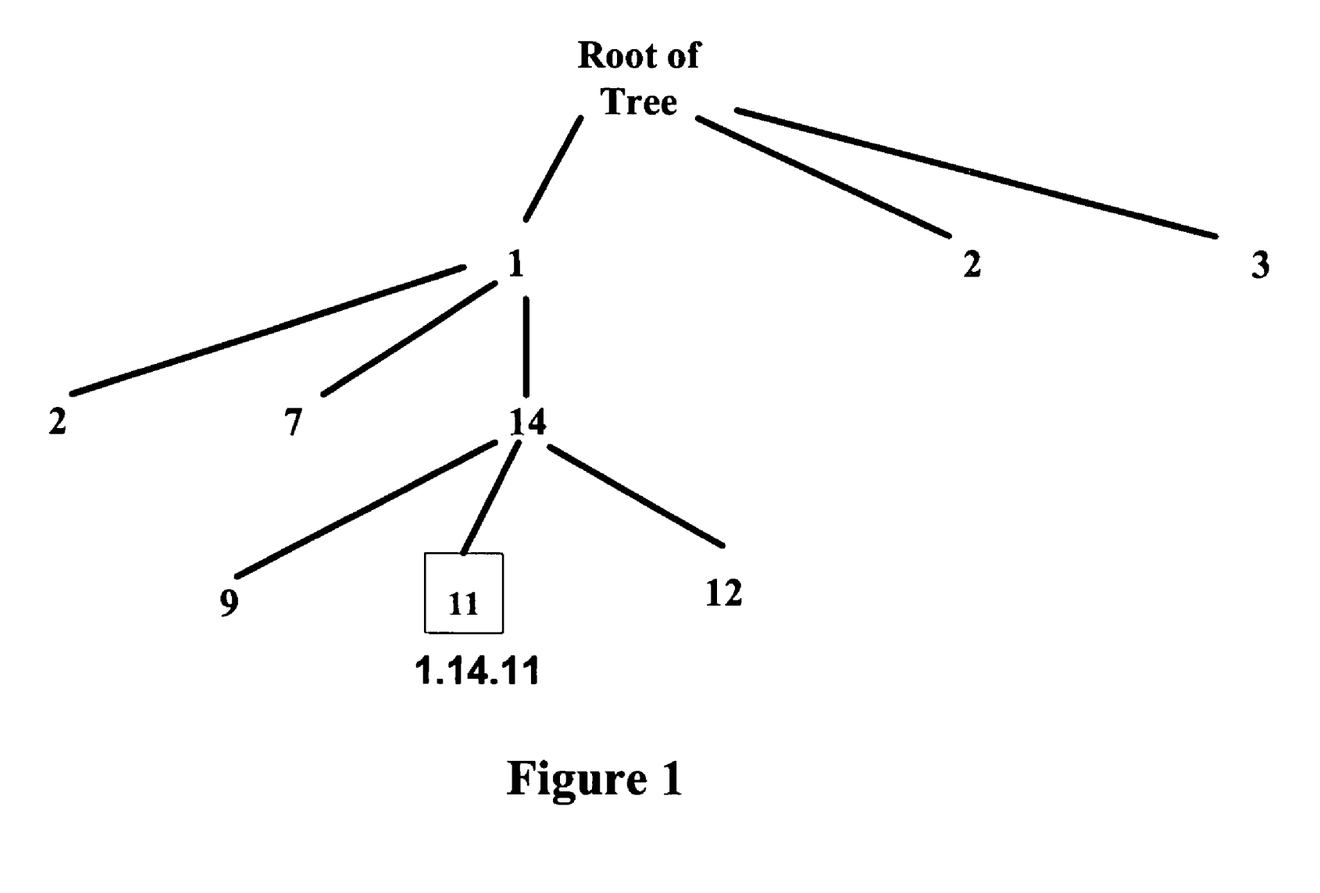
FIG. 1 shows how OIDs can be interpreted as nodes of a tree.

FIG. 1 shows an example of the definition of a node in this way. If there are several instances of a object corresponding to a particular node it is usual to put them on the same level of the hierarchy. In FIG. 1 the OIDs:

1.14.9
1.14.11
1.14.12 could represent the same class of object.

In the SNMP protocol particular nodes may be addressed by giving the full OID or, alternatively, a "next" node or nodes may be addressed. In FIG. 1 the next node after 1.7 is 1.14; and, the next node after 1.14 is 1.14.9.

The interpretation of OIDs is defined in management information databases or "MIBs". The information in a MIB enables the OID for a particular control data object to be determined and defines the type and format of the data object. SNMP managers and agents generally require access to MIBs characterizing all the objects they deal with. Usually a specific MIB is written for an agent at a particular address on a network.

Where a range of products is to be designed with SNMP control in mind it is generally necessary for a new MIB to be written and made available every time a new product is added to the range. This is particularly so if commercially available general-purpose SNMP software is to be used. If the products in the range have similar functions and the differences between them are small, it may be possible to write a generic MIB applicable to all of them. However, where the product range may encompass arbitrary functionality, this is impossible.

In some industries, for example audiovisual content creation, it is common for functional elements to be made available as modules or sub-assemblies, one or more of which can be housed in a general-purpose enclosure, which provides common support functions (such as power and control). If such a general-purpose enclosure provides an SNMP control agent it will typically be necessary for a customized MIB to be available to it and the content of that MIB must depend on the particular functional elements installed in the particular general-purpose enclosure. Thus if the modules of the enclosure are changed, it is typically necessary for a new MIB to be used by that enclosure, or the agent for that enclosure. The flexibility of the modular system is therefore reduced.

SUMMARY OF THE INVENTION

The present invention proposes a novel type of SNMP agent which can monitor and control a number of functional elements without requiring detailed a priori knowledge of those functional elements.

The invention consists in one aspect of a method for monitoring or controlling a plurality of equipment modules employing a common network agent, said network agent controlling one or more addressable module locations, the method comprising: interrogating the addressable module locations for the presence of an equipment module; for each equipment module identified, determining an equipment type; for each equipment type identified, determining a list of available control objects associated with that equipment type; associating values with the control objects of equipment modules to be controlled; and communicating said values across a network, wherein the values are identified by equipment type and by control parameter.

Suitably, interrogating module locations is performed periodically. Preferably the list of available control objects has a specified order, and values are identified by position in the list of control objects.

Preferably a database of said values is compiled, the database structured according to equipment type and control parameter. Advantageously, an SNMP command can then be received and parsed to determine an equipment type and a control parameter. The agent can then return or update the value in said database corresponding to that equipment type and control parameter, according to the command.

In a further aspect the invention consists of a method for automatically creating or updating an MIB for an agent controlling a plurality of equipment modules, the method comprising determining an equipment type for each module to be controlled by said agent; determining the available control objects associated with each equipment type identified; and creating a data array for storing values for each control parameter for each equipment module to be controlled by said agent, each location of the array addressable by equipment type and by control parameter number.

The invention extends to methods and/or apparatus substantially as herein described with reference to the accompanying drawings.

The invention also provides a computer program and a computer program product for carrying out any of the methods described herein and/or for embodying any of the apparatus features described herein, and a computer readable medium having stored thereon a program for carrying out any of the methods described herein and/or for embodying any of the apparatus features described herein.

An embodiment of the invention will now be described with reference to the drawings in which;

DETAILED DESCRIPTION OF THE INVENTION

Figure 2:
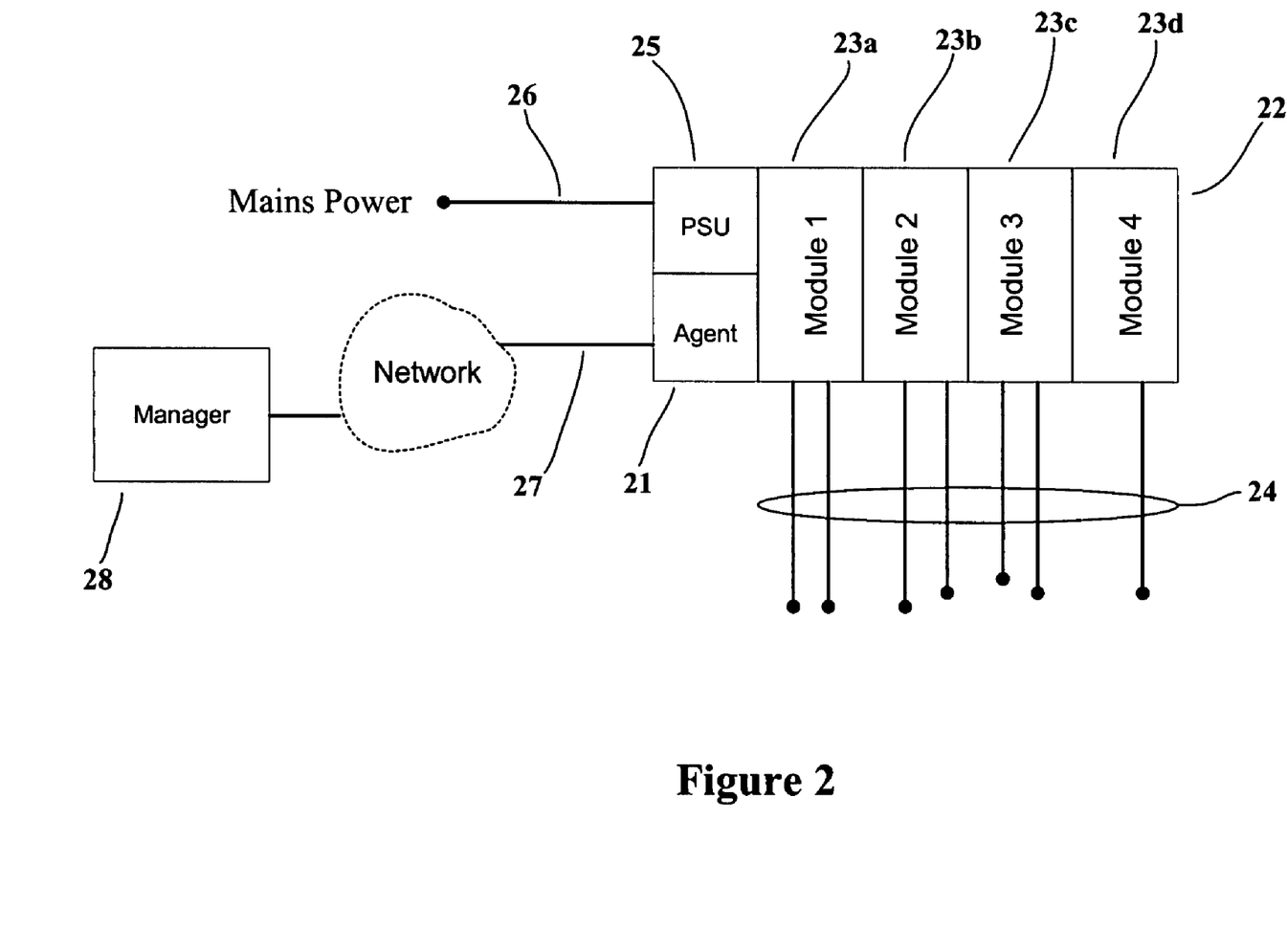
FIG. 2 shows a modular product controlled according to an embodiment of the invention.

Referring to FIG. 2, an SNMP agent runs on a processor (21) in a general-purpose module-rack (22). The rack has a number of slots into which equipment modules (23a) (23b) (23c) (23d) are plugged. The individual modules have input and output connections (24) appropriate to their functions. A power unit (25) is connected (26) to a source of mains power and converts this power into a form suitable for the modules (23).

The processor (21) has a connection (27) to a data network, and will typically have its own IP address so that it can be distinguished over the network. The processor (21) also has connections to the modules (23) and communicates values of control objects to and from one or more of them. The current values of these objects are stored in the processor (21) and are made available, via the network connection (27) to a remote processor (28) which runs an SNMP manager. Using the SNMP protocol, control objects for particular modules are reported to the processor (28) and control objects for particular modules are set to specific values.

The SNMP manager in the remote processor (28) makes use of a MIB to learn the OIDs and data types and formats of the various items of control data. Typically this MIB would be written by the designer of the installation which includes the module rack (22). This work is simplified if "generic" MIBs for the modules (23) are available from their manufacturer and they can easily be combined to make a specific MIB for the rack (22) as it is configured in its particular installation.

The SNMP agent in the processor (21) must associate particular SNMP OIDs with particular control data items relating to the modules (23). In the case where a new module has been inserted, or modules have been changed, the agent may not have a MIB to fully interpret these OIDs. In the system of the invention the agent does not require knowledge of the MIB used in the remote processor (28). This is achieved by locating each control object in a storage location which is associated with a position in a two-dimensional table. Particular pairs of numbers in the string of numbers comprising an OID are treated as addresses to the rows and columns of the table.

The table is structured with an extensible space for module control data objects. In a typical module rack with space for a maximum of 16 modules, the table is structured with space for at least 16 instances of an unlimited number (no more than 16 in any practical example) of different types of module; and, for each module, an extensible space for module data objects.

The agent periodically interrogates each slot (or interrogates each slot at the time its operation is initiated) to obtain:
the identity of the equipment module (if any) in that slot,
the identities, data types and formats of the control data objects for that module; and,
the current values of the control data objects.

The module identities and the data object identities are represented by integers whose interpretation is defined in module-specific, generic MIBs published for each module. These module-specific MIBs can be used by any SNMP manager needing to control the relevant module, regardless of the configuration of the module rack in which the module is installed.

Figure 3:
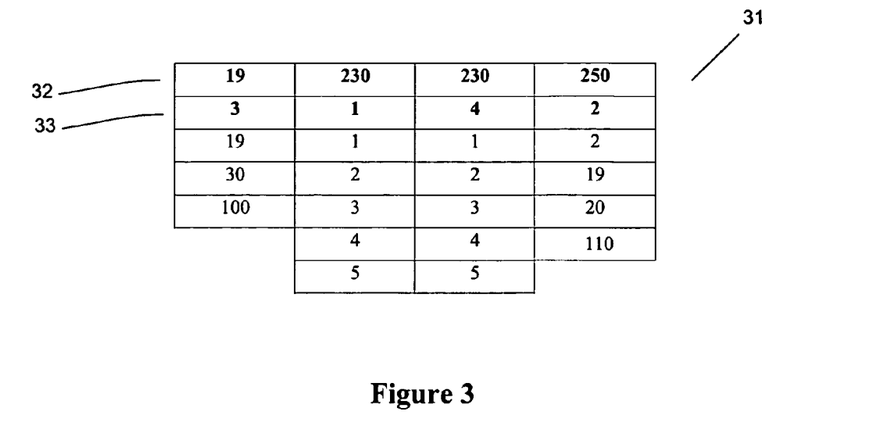
FIG. 3 shows a tabular interpretation of an OID.

FIG. 3 shows how the agent running on the processor (21) stores the results of the interrogation of the modules in the slots of the rack (22) in the table. The table (31) has one column for each module (23). Typically the maximum number of modules which can fit in an enclosure is limited and so the maximum possible number of columns is limited to that number.

Each column has a header row (32) and the cells of this row contain equipment-type identifiers which identify the individual equipment modules (23a) to (23d). The identifiers are the numbers which are defined in a published MIB for the respective modules and in this example correspond to the number in the OID string defining the particular module type. The order of the columns of the table (31) is arranged so that the module identifiers are arranged in ascending order. It can be seen that modules having type 19, 230 and 250 are present, and that there are two type-230 modules present.

Each column has a second header row (33) and the cells of this row contain "slot identifiers" which indicate which position in the enclosure (22) is occupied by a particular module. It can be seen that the two type-230 modules are in slots 1 and 4.

Each column of the table (31) contains a cell for each of the data object identifiers for the module identified by the header rows. The data object identifiers are sorted into numerical order. Each type of equipment module has a known number of commands. The number of cells in each column therefore depends on the number of commands reported in the previously described interrogation process and defined in the published MIB for that relevant module.

It can be seen that the type-19 module has only three commands, and that type-230 modules have five commands. The agent need not have prior knowledge of every possible module type, and the associated number of commands. These are provided by the equipment modules themselves, when interrogated by the agent.

Each of the cells containing a data object identifier is associated with a storage location for the relevant data object that will be reported to, or set by the SNMP manager running on the processor (28).

Figure 4:
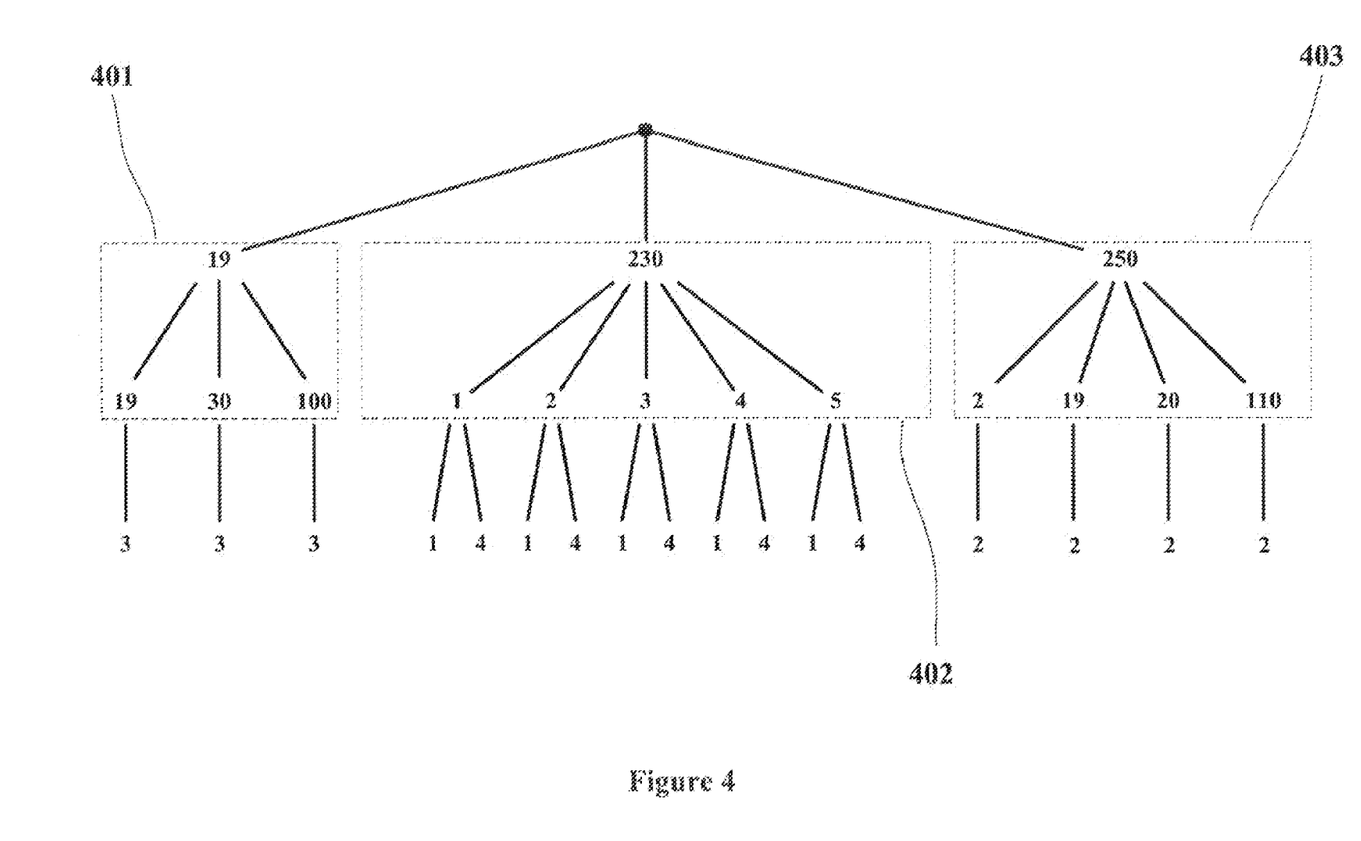
FIG. 4 shows a tree interpretation of an OID.

The table (31) can be interpreted as a tree with nodes numbered according to the header rows and contents of the table as shown in FIG. 4.

It can be seen that the hierarchy of the table in FIG. 3 is different from that of the tree in FIG. 4, but they are logically related so that one may be derived from the other. The tree of FIG. 4 can be divided into sections (401) (402) (403), each section corresponding to a particular module type. MIBs corresponding to these sections can be published as each relevant module becomes available and used to construct MIBs for SNMP managers controlling racks containing these modules. Where more than one instance of a module is present in a particular rack, its location within the rack (slot number) will be known from system design data and it is only necessary to append the slot number to the OID for a particular data object in order to control or monitor that data object.

When an OID (forming part of an SNMP message) is received by the agent running in the processor (21) the agent interprets the OID according to the tree as shown in FIG. 4 and is able to locate the corresponding cell in the table of FIG. 3 and so access the corresponding control object.

The agent examines in turn each constituent number element in the OIDs of SNMP commands received from the network to select data objects relevant to it. It will not have prior knowledge of all of the number elements but the OID is structured so that one of the elements represents module identity, and another represents command parameter identity. The positions of these numbers are the same in all module OIDs and they can be used be the agent to address the table and so identify a particular stored control parameter for reporting or modification (depending on the SNMP message containing the OID).

It is noted that in the present example, where two type-230 modules are present, these occupy adjacent columns in the data table even though they are not physically located in adjacent slots. The two modules can therefore be addressed distinctly using a "next" node syntax as described above.

It is intended that the foregoing detailed description be regarded as illustrative rather than limiting and that it be understood that it is the following claims, including all equivalents, that are intended to define the scope of the invention. The embodiment of any figure or described example or any feature thereof may be combined with the embodiment of any other figure or described example. Other features known in the art and not inconsistent with the structure and function of the present invention may be added to an embodiment or example described herein.

The invention claimed is:

1. A method for monitoring or controlling a plurality of equipment modules in a general-purpose module rack, the equipment modules employing a common network agent running on a processor of the module rack, said network agent controlling a plurality of addressable module locations of the module rack, each location capable of having an equipment module installed therein, the method comprising, at the network agent:
    interrogating each addressable module location to identify whether an equipment module is installed in the location;
    for each equipment module identified, determining an equipment type, the plurality of equipment modules having at least two equipment types;
    for each equipment type identified, determining a list of available control data objects associated with that equipment type, wherein control data objects represent values for use in monitoring or controlling equipment;
    compiling a management information database using information about the list of available control data objects associated with each equipment type, the management information database being used by the network agent to interpret object identifiers sent from a network manager;
    associating values with the control data objects of equipment modules to be controlled;
    communicating said values across a network, wherein the values are identified by equipment type and by control data object;
    periodically determining the types of the equipment identified at each module location in the module rack and lists of available control data objects for the identified equipment types; and
    updating the management information database using updated information about the lists of available control data objects associated with the types of the equipment identified at each addressable module location;
    wherein each of at least some of the control data objects is associated with a dot separated string of integers, and an integer in the dot separated string of integers specifies the location of the equipment module associated with the control data object within the module rack.

2. The method of claim 1, wherein said list of available control data objects has a specified order, and wherein values are identified by position in the list of control data objects.

3. The method of claim 1, further comprising receiving an SNMP command; parsing said command to determine an equipment type and a control data object; and returning or updating the value in said database corresponding to that equipment type and control data object.

4. The method of claim 1 in which each control data object is associated with a dot separated string of integers, and an integer in the dot separated string of integers specifies the location of the equipment module associated with the control data object within the module rack.

5. A method for automatically creating or updating a MIB for an agent running on a processor of a general-purpose module rack, the agent controlling a plurality of equipment modules in the module rack, the method comprising:
    periodically determining an equipment type and location within the module rack for each equipment module to be controlled by said agent;
    determining one or more available control data objects associated with each equipment type identified, wherein control data objects represent values for use in monitoring or controlling equipment; and
    updating a data array for storing values for each control data object for each equipment module to be controlled by said agent, the updating being based on changes in the equipment modules in the module rack, the data array comprising a respective column associated with each equipment module specifying the equipment type and location within the module rack of the respective equipment module and having one or more cells specifying control data object numbers associated with the respective equipment module;
    wherein each of at least some of the control data objects is associated with a dot separated string of integers, and an integer in the dot separated string of integers specifies the location of the equipment module associated with the control data object within the module rack.

6. The method of claim 5 in which each control data object is associated with a dot separated string of integers, and an integer in the dot separated string of integers specifies the location of the equipment module associated with the control data object within the module rack.

7. A method for monitoring or controlling a plurality of equipment modules installed in slots of a general purpose module rack using control data objects representing values for use in monitoring or controlling said equipment modules, the method comprising
    receiving information relating to at least one of said equipment modules;
    associating a dot separated string of integers with a selected one of said control data objects related to said equipment module by making use of said received information, wherein said received information includes the slot location of said equipment module within the rack and wherein an integer in the dot separated string of integers specifies the slot location of said equipment module within the rack; and
    utilizing said associated dot separated string of integers in a message for monitoring or controlling said equipment module.

8. The method of claim 7, wherein the slot location of said equipment module is appended to the dot separated string of integers identifying a selected one of said control data objects related to said equipment module.

9. The method of claim 7, comprising periodically determining the types of the equipment identified at each slot location in the module rack and lists of available control data objects for the identified equipment types, and updating a management information database using updated information about the lists of available control data objects associated with the types of the equipment identified at each addressable module location, the management information database being used by a network agent running on a processor of the module rack to interpret object identifiers sent from a network manager.

10. The method of claim 7, comprising periodically updating a management information database by a network agent running on a processor of the module rack as equipment is added to or removed from the slot locations.

11. A non-transitory computer-readable medium having encoded thereon software constructed and adapted to operate as an SNMP agent for a plurality of equipment modules installed in slots of a general purpose module rack, the agent running on a processor of the general purpose module rack, wherein the SNMP agent communicates the values of control data objects describing or controlling the operation or status of an equipment module in the rack to or from an SNMP manager and uses module location information defining the slot location of the module within the rack, and module type information obtained from said equipment module, to interpret SNMP messages from said SNMP manager, each of at least some of the SNMP messages containing a dot separated string of integers having an integer representing a slot location within the general purpose module rack.

12. The non-transitory computer-readable medium of claim 11, in which said information is obtained from said module when the operation of the agent is initiated.

13. The non-transitory computer-readable medium of claim 11, in which said information is obtained from said module at regular intervals.

* * * * *

UNITED STATES PATENT AND TRADEMARK OFFICE
CERTIFICATE OF CORRECTION

| | |
|---|---|
| PATENT NO. | : 8,407,328 B2 |
| APPLICATION NO. | : 11/404507 |
| DATED | : March 26, 2013 |
| INVENTOR(S) | : Sandy Kellagher and Jonathan Riches |

It is certified that error appears in the above-identified patent and that said Letters Patent is hereby corrected as shown below:

Title page, col. 2, (74) *Attorney, Agent, or Firm*, delete "Richarson" and insert -- Richardson --.

Signed and Sealed this
Sixteenth Day of July, 2013

Teresa Stanek Rea
*Acting Director of the United States Patent and Trademark Office*